United States Patent
Zuqert et al.

(10) Patent No.: US 6,466,832 B1
(45) Date of Patent: Oct. 15, 2002

(54) HIGH QUALITY WIRELESS AUDIO SPEAKERS

(75) Inventors: Benjamin Zuqert, Tel Aviv; Oren Tirosh, Ra'anana; Giora Sussman, Moshav Bnei Zion; Dan Rephaeli, Kfar Saba, all of (IL)

(73) Assignee: Altec Lansing R & D Center Israel, Kfar Saba (IL)

( * ) Notice: Subject to any disclaimer, the term of this patent is extended or adjusted under 35 U.S.C. 154(b) by 0 days.

(21) Appl. No.: 09/138,606

(22) Filed: Aug. 24, 1998

(51) Int. Cl.[7] .............................................. G06F 17/00
(52) U.S. Cl. ....................................................... 700/94
(58) Field of Search ................................ 370/328, 329, 370/330, 343, 345; 375/219, 221, 225, 227, 240, 259, 267; 455/59, 132–135; 381/2, 3, 14; 700/94

(56) References Cited

U.S. PATENT DOCUMENTS

| | | | |
|---|---|---|---|
| 4,829,570 A | | 5/1989 | Schotz |
| 5,272,525 A | | 12/1993 | Borchardt et al. |
| 5,319,716 A | | 6/1994 | McGreevy |
| 5,349,386 A | | 9/1994 | Borchardt et al. |
| 5,410,735 A | | 4/1995 | Borchardt et al. |
| 5,491,839 A | | 2/1996 | Schotz |
| 5,581,617 A | | 12/1996 | Schotz et al. |
| 5,625,881 A | * | 4/1997 | Sandler et al. ................ 455/59 |
| 5,666,658 A | | 9/1997 | Borchardt et al. |
| 5,673,323 A | | 9/1997 | Schotz et al. |
| 5,832,024 A | * | 11/1998 | Schotz et al. ................ 375/200 |
| 6,023,459 A | * | 2/2000 | Clark et al. .................. 455/447 |

FOREIGN PATENT DOCUMENTS

| WO | 93/04540 | 3/1993 |
|---|---|---|
| WO | 94/28639 | 12/1994 |
| WO | 96/32785 | 10/1996 |
| WO | 97/29550 | 8/1997 |

OTHER PUBLICATIONS

"RF–Link Refines Wireless Tech", Jan. 1, 1997.
"Technical Data Sheet", Intellon, Jun. 1996, pp. 1–4.
Paradox's Wireless Audio Products, "TRX–7000 Wireless Speakers . . . the finest 900 MHz wireless audio!", Jan. 14, 1998, pp. 1–4.
Lindner, Wireless 25–watt speaker; 900 MHz technology, "Next Generation of Speakers Offer Wireless Power and Performance Never Before Thought Possible", Jan. 14, 1998, pp. 1–2.
"Coming Soon! JBL WRKW1000 Wireless Speakers", Jan. 14, 1998.
"New Items", Jan. 12, 1997.
"Recoton Wireless Home Theater Rear Channel Speakers", Direct Sales, Inc., Jan. 14, 1998.
Brent Butterworth, "Paradox LLCs TRX7000", Oct. 1996, Rain Corporation.
"JBL WRKW 1000 Wireless Speaker System", Audio Video Solutions, Jan. 12, 1998.

* cited by examiner

Primary Examiner—Minsun Oh Harvey
(74) Attorney, Agent, or Firm—Pillsbury Winthrop LLP

(57) ABSTRACT

A wireless transmission system for transmitting audio data. The system includes a transmitter which re-frames the audio data into a plurality of packets and wirelessly transmits at least two copies of each packet during substantially non-overlapping periods, and one or more receivers which receive the plurality of packets and assess a quality level of at least one of the copies thereof, so as to extract the audio data from one of the copies having a desired quality level. Preferably, the receivers include respective back-transmitters, which transmit control commands back to the transmitter, responsive to the data.

38 Claims, 8 Drawing Sheets

HIGH QUALITY WIRELESS AUDIO SPEAKERS

FIELD OF THE INVENTION

The present invention relates generally to wireless local audio transmission, and specifically to high quality wireless audio speakers.

BACKGROUND OF THE INVENTION

Wireless local transmission of audio data has become very popular in recent years. Wireless transmission eliminates the need for wires which are annoying and limiting. Local wireless transmission is used, for example, in portable home telephone systems, stereo systems, home theater systems, and sound surround systems.

U.S. Pat. Nos. 5,272,525, 5,349,386, and 5,319,716, which are incorporated herein by reference, describe wireless local transmission systems which transmit audio and/or video signals as modulated RF signals.

However, wireless transmission systems are limited in their transmission range and quality. One transmission problem is due to interference from other wireless communication systems, such as cordless telephones and remote control devices. These limitations are especially annoying in audio systems for high quality music transmission.

In order to avoid such interference and limitations U.S. Pat. No. 5,491,839 suggests having a transmitter and one or more receivers which allow a user to select a frequency band for transmission. Thus, the user may select a band which has less interference than other bands. In addition, the receivers have a muting circuit which is operated when a faulty signal is encountered in the transmitter or in the receiver.

PCT publication WO97/29550 describes transmitting audio data as digital signals. A forward error correction encoder and an interleaver are used to minimize the damage caused by noise and interference to the audio data.

However, improvement of transmission of audio data is still sought. It is particularly desirable to achieve high-fidelity audio transmission without requiring adjustments to be performed by the user.

SUMMARY OF THE INVENTION

It is an object of some aspects of the present invention to provide a system for high-fidelity local transmission of audio data.

It is another object of some aspects of the present invention to provide methods and apparatus for digital transmission of audio data in relatively narrow bands, such as, the ISM 900 MHz band.

It is another object of some aspects of the present invention to provide methods and apparatus for transmission of audio data with two-way control communications.

It is another object of some aspects of the present invention to provide low-cost apparatus for transmission of digital audio data.

It is another object of some aspects of the present invention to provide methods and apparatus for digital transmission of audio data with low transmission delay.

It is another object of some aspects of the present invention to provide systems for transmission of audio data, such that a plurality of systems may be used simultaneously in a single area without interfering each other.

In some aspects of the present invention, the systems, apparatus and methods are used to transmit video data, as well as audio data.

In preferred embodiments of the present invention, audio input data is wirelessly transmitted from a transmitter to one or more compatible receivers. The transmitter and receivers may comprise a standalone system which is used together with separate audio generators and speakers. Preferably, however, the transmitter and receivers are integrated in a stereo or surround system, in which the transmitter is connected to or is a part of a music generator such as a CD or DVD player, and the receivers are connected to, or part of, one or more wireless speakers.

The audio data is converted to digital form, if not already in digital form, and is preferably compressed and encoded to a coded form which allows high-quality, low-delay transmission of the audio data. Preferably, the compression is performed according to a standard compression scheme such as an audio MPEG compression scheme. The audio data is encapsulated together with ancillary data into packets, preferably having a fixed length determined according to transmission and delay considerations, as is known in the art. The methods and apparatus for data encoding and encapsulation, along with the use of the ancillary data, enable the system to convey sound of improved quality, and with greater user convenience, relative to wireless audio systems known in the art.

The ancillary data preferably includes audio control data, such as a volume indication and system control data. The system control data comprises indication of frequencies used and identification information which allows a receiver to easily ignore packets addressed to a different receiver, thus preventing crosstalk. Preferably, the identification includes a unique ID which identifies the transmitting system, and an indication to which receiver of the transmitting system the packet is addressed. For example, the indication to which receiver the packet is addressed may include indication of right or left, front or rear and/or main or sub-woofer.

Preferably, the ancillary data includes indication of a frequency channel at which the current packet is transmitted in order to allow the receiver to tune onto the frequency channel on which the packets are transmitted.

In some preferred embodiments of the present invention, the audio control data comprises a volume level, preferably for right and left receivers separately. Thus, when a low volume is used there is no need to lower the magnitude of the audio input to the transmitter and decrease the dynamic range of the signal. Rather, the audio input is transferred at full magnitude to the receivers which control the volume of the signal according to the volume level.

In some preferred embodiments of the present invention, each packet is transmitted in at least two copies to the receivers, preferably on two respective frequency channels. Preferably, the receivers assess the packets and assign a quantitative performance value to the received packets, generally based on an error detection code, such as CRC. Alternatively or additionally, the signal strength of the received signal is used in assigning the quantitative performance value to the received signal. Preferably, for each packet, the receivers choose the copy having the highest quantitative performance value, and this copy is used by the receiver to extract the audio data.

In one such preferred embodiment of the present invention, when the receiver receives the first copy it calculates the CRC of the received data and compares it to the transmitted CRC. If the calculated CRC is not identical to the transmitted CRC, the first copy is identified as "defective", and the second copy is read and its CRC is calculated and compared to its transmitted CRC. If the calculated CRC in the second copy is correct, the audio data of the second copy is played by the speaker associated with the receiver. If, however, the calculated CRC of both copies is defective, then the speaker is preferably kept silent for a predetermined period of between about 0.1 and 1 seconds, preferably using a soft mute procedure described hereinbelow. Alternatively or additionally, the copy with a higher quantitative performance value is played, provided the performance value is above a predetermined threshold. If the calculated CRC in both copies is correct, then the copy with the highest quantitative performance value is chosen.

Alternatively or additionally, the receiver uses the first copy which arrives unless it is found to be defective (i.e., to include noise and/or errors beyond a predetermined level), for example by CRC calculation and comparison. Only when the first copy is defective does the receiver read the second copy and play it if it is not defective.

Preferably, as noted above, the at least two copies are transmitted on at least two respective distinct frequency bands, such that frequency dependent interference may be overcome by choosing the copy of the packet exhibiting a lower level of interference. Further preferably, the at least two frequency bands are separated by a span larger than bands typically used by interfering apparatus, such as cordless telephones. The separating band is preferably of a constant width for any pair of frequencies and is preferably wider than 10 MHz and more preferably about 12 MHz, for systems using bands of a total bandwidth of 26 MHz such as the ISM 900 MHz band. In systems using larger total bandwidths the separating band is preferably larger and is between about 30 and 50% of the size of the total bandwidth used by the system.

Preferably, the transmitter transmits to each operating receiver two continuous streams of packets in the two distinct frequency bands. Each stream of packets preferably includes packets addressed to two separate speakers in an interlaced order. For example, the two speakers may be right and left speakers of a stereo player.

Preferably, the two streams are timed such that at the time the first stream includes a packet addressed to the right speaker, the second stream includes a packet addressed to the left speaker, and vice versa. Such timing prevents a transient interference from destroying both copies of the packet, since the two copies are not transmitted at the same time. In addition, there is no need for any of the speakers to have more than one receiver to receive both copies of a packet from the two different channels. A single receiver may be tuned onto the first channel to receive the first packet and then immediately move to the second channel to receive the second copy on the second channel. Preferably, each packet is transmitted for about four milliseconds and the switching time required to move from one channel to the other is less then 5 $\mu$sec. It is noted that prior art systems use frequency diversity in which two copies of a packet are transmitted simultaneously. In these systems two different receivers are needed to receive both copies of the packet.

In some preferred embodiments of the present invention, the at least two distinct frequency channels are chosen from a plurality of predetermined frequency channels, which are preferably organized in predetermined pairs. In a preferred embodiment of the present invention, the system has at least eleven pairs of predetermined channels, which are within a range assigned by the FCC for use by unlicensed users, such as 902–928 MHz, 2.4–2.483 GHz, or the 5.5 GHz range. It is noted that the 902–928 MHz band is relatively narrow and therefore requires use of narrow-band frequency channels to allow for a plurality of unique frequency channels. Preferably, the bandwidth of each of the frequency channels is narrower than 1 MHz and most preferably less than 750 kHz. Further preferably, the transmitter does not use a spread-spectrum method of modulation, but rather concentrates the data in the relatively narrow band.

In some preferred embodiments of the present invention, the frequency channels are chosen from the plurality of predetermined channels automatically by the transmitting unit. Preferably, in systems as described below in which the receivers transmit control signals back to the transmitter, the channels are chosen according to tests performed on a plurality of bands to determine the bands which have low interference rates.

In some preferred embodiments of the present invention, the receivers automatically lock onto the frequency bands of the packets transmitted from the transmitting unit. Preferably, using the ancillary information included in the packets, the receivers automatically tune to the frequency which provides best reception quality of the packets transmitted on the channel. Preferably, the packets include an indication of the frequency on which they are primarily transmitted so that the receiver may verify and/or switch to the primary frequency. The packets are preferably checked for their ID to prevent locking onto a frequency of signals from a different system.

In some preferred embodiments of the present invention, stereo audio signals are transmitted as two separate mono signals, thus allowing independent transmission of the signals, resulting in better quality transmission. Thus, each receiver needs to receive only its own mono signals, which naturally comprise a lower data volume than the stereo signals. Therefore, the transmission time required is reduced, and the time saved may be used for the double transmission of the signals described hereinabove. In other words, instead of having the receivers receive long data packets including the audio information for two receivers, the packets are divided into two parts, and each receiver may receive to the part which it needs.

In some preferred embodiments of the present invention, the transmitter and/or receivers include a user interface which allows the user to monitor and modify the transmission in addition to the automatic monitoring functions described herein. Preferably, the user interface (typically of the receiver) includes a display, such as an LED bar graph, indicative of the signal quality, and controls which allow adjustment of the acquisition of the signals and of the identity of the speakers (left/right). Preferably, the signal quality is a multi-level function of the percentage of packets in which errors are detected and of the received signal strength.

The user interface of the transmitter preferably includes a control which initiates changing one or more of the frequency channels that are in use. In addition, the user interface of the transmitter preferably allows adjustment by the user of other features such as the volume, ID generation and power on/off control.

Alternatively or additionally, two-way control communication may be implemented, as described hereinbelow, between the transmitter and receivers, in which case each of the elements of the user interface may be implemented in either the transmitter, or in one or more of the receivers, or in both the transmitter and the receivers (i.e., the speakers). Such flexibility in the location of the user interface makes it easier for the user to position and adjust the speakers for optimal audio reception.

In some preferred embodiments of the present invention, the receivers transmit control signals back to the transmitter to monitor the transmission. Preferably, when a high occurrence rate of defective packets is detected at the receiver in a particular frequency channel, the receiver automatically sends a request to the transmitter that the packets be transmitted using a different frequency channel.

Preferably, major functions of the transmitter and receiver, such as compression and decompression, and operations conventionally performed by a modem, or a controller, are implemented mainly in software so as to reduce the cost of the hardware and to achieve greater flexibility in the operation of the system.

There is therefore provided in accordance with a preferred embodiment of the present invention, a wireless transmission system for transmitting audio data, including a transmitter which re-frames the audio data into a plurality of packets and wirelessly transmits at least two copies of each packet during substantially non-overlapping periods, and one or more receivers which receive the plurality of packets and assess a quality level of at least one of the copies thereof, so as to extract the audio data from one of the copies having a desired quality level.

Preferably, the transmitter compresses the data using a standard compression method.

Preferably, the transmitter re-frames the data by adding a correction code to the audio data.

Preferably, the audio data includes stereo signals, and the transmitter compresses and transmits the signals as a pair of mono signals.

Preferably, each packet includes audio signals belonging to only one of the pair of mono signals.

Preferably, the transmitter adds a volume level indication to at least some of the packets, so that the audio data has a generally constant magnitude irrespective of the volume level.

Preferably, the transmitter transmits the at least two copies on at least two respective, distinct carrier frequencies.

Further preferably, the distinct frequencies are mutually separated by at least 10 MHz.

Preferably, re-framing the data includes adding an indication the frequency at which the packets are transmitted.

Preferably, a user initiates a change of the frequencies by inputting a user signal to the transmitter.

Preferably, the receivers automatically tune in to the distinct frequencies.

Preferably, the transmitter transmits an indication of the distinct frequencies along with the signals.

In a preferred embodiment, the frequencies are in the band 902–928 MHz.

Preferably, the plurality of packets are transmitted in a signal having a bandwidth narrower than 1 MHz.

Preferably, each receiver assesses the quality of the at least two copies of the packets and extracts the audio data from the copy which is of better quality.

Alternatively or additionally, the receiver assesses the quality of a second copy of the at least one copies if a first copy of the at least one copies has an undesired quality.

Preferably, when the quality level of substantially all of the copies of a packet is beneath a predetermined quality threshold, the audio data in the packet is discarded by the receiver.

Preferably, the receiver plays silence instead of the discarded audio data.

Preferably, a copy is beneath the predetermined quality threshold when an error is detected in the copy.

Preferably, the transmitter adds an ID to the packets, and the receivers ignore packets which do not carry the correct ID.

Preferably, the receivers include back-transmitters which transmit control commands back to the transmitter.

There is further provided in accordance with a preferred embodiment of the present invention, wireless speaker system for audio data, including a transmitter which wirelessly transmits the audio data, and at least one speaker, which receives and plays the audio data and which includes a back-transmitter, which transmits control commands back to the transmitter responsive to the data.

Preferably, the back-transmitter transmits an indication of the quality of the received packets and the transmitter changes a parameter of the audio transmission accordingly.

Preferably, the transmitter changes the frequency of transmission responsive to an indication of low quality of the received audio data.

There is further provided in accordance with a preferred embodiment of the present invention, a wireless speaker system for audio data, including a transmitter which wirelessly transmits the audio data on at least one carrier frequency, and at least one speaker, which automatically tunes in to the carrier frequency and plays the audio data.

Preferably, the transmitter re-frames the audio data in a packet including tuning information; and the speaker automatically tunes in to the carrier frequency using the tuning information.

Preferably, the tuning information includes an identification of the carrier frequency, an identification code of the at least one speaker, and/or an error detection code.

There is further provided in accordance with a preferred embodiment of the present invention, a method of wirelessly transmitting digital audio data, including re-framing the audio data, transmitting at least two copies of the re-framed audio data during substantially non-overlapping periods, receiving the at least two copies, assessing a quality level of one or more of the at least two copies, and extracting the audio data from one of the copies which has a desired quality level.

Preferably, transmitting the at least two copies includes transmitting the at least two copies on at least two respective, distinct carrier frequencies.

Preferably, transmitting on the at least two respective, distinct carrier frequencies includes transmitting on at least two distinct frequencies which are mutually separated by at least 10 MHz.

Preferably, re-framing the data includes adding an indication of the frequency at which the copies are transmitted.

Preferably, receiving the at least two copies includes automatically tuning the receivers in to the distinct frequencies.

Preferably, assessing the quality includes determining an error rate and an AGC level of the received copies.

Alternatively or additionally, assessing the quality includes determining whether errors have occurred in the at least two copies, and extracting the data includes discarding the at least two copies when errors have occurred in substantially all of the at least two copies.

Preferably, re-framing the audio data includes annexing a volume indication to the re-framed audio data.

Preferably, re-framing, transmitting, receiving, assessing and extracting the audio data introduce a delay of less than 50 msec.

There is further provided in accordance with a preferred embodiment of the present invention, a method of wirelessly transmitting digital audio data, including re-framing the audio data into packets which do not carry volume data, annexing a volume level to at least some of the packets, and transmitting the packets.

Preferably, the method includes receiving the packets and playing the audio data at a volume responsive to the volume level.

There is further provided in accordance with a preferred embodiment of the present invention, a wireless audio speaker for playing audio signals transmitted by a transmitter, including a receiver circuit which receives the audio signals, calculating circuitry which calculates a multi-level quality indication responsive to the received audio signals, and a display, which displays the quality indication.

Preferably, the multi-level indication includes at least three indication levels.

Alternatively or additionally, the quality indication is calculated based on an error rate in the audio signals.

Preferably, the audio signals include digital audio signals, and the error rate is determined responsive to a CRC code.

Preferably, the receiver circuit instructs the transmitter to change at least one transmission parameter of the signals when the quality indication is below a predetermined level.

There is further provided in accordance with a preferred embodiment of the present invention, a method of providing an audio signal quality indication for a wireless speaker system, including determining the number of errors in the audio signal, determining the signal strength of the audio signal, rating the quality of the audio signal with a multi-level quality indication based on the signal strength and the number of errors.

Preferably, the multi-level indication includes at least five indication levels.

There is further provided in accordance with a preferred embodiment of the present invention, a receiver of wireless audio signals including a demodulator, which separates the signals at the intermediate frequency into two base-band signal components substantially in phase quadrature, which have two respective DC offsets, a local oscillator (LO) which provides one or more reference signals to the demodulator, and a phase shifter which adjusts the reference signals so as to minimize a difference between the two DC offsets and a desired offset value.

Preferably, the phase shifter adjusts the reference signals so that the two DC offsets are substantially evenly distanced from the desired value.

There is further provided in accordance with a preferred embodiment of the present invention, a wireless transmission system for transmitting audio data, including a transmitter which re-frames the audio data into a plurality of packets and wirelessly transmits the packets, and one or more receivers which receive the plurality of packets, determine whether the transmitted packets are defective, and convey non-defective packets to be played by a speaker.

Preferably, the transmitter transmits at least two copies of each of the packets, and defective packets include packets of which substantially all copies are defective.

Preferably, after receiving a first predefined number of defective packets, the one or more receivers discard a second predefined number of non-defective packets before resuming conveying non-defective packets to the speaker.

Preferably, the first predefined number is between 1 and 3.

Preferably, the second predefined number is between 25 and 32.

Preferably, a third predefined number of packets received after the second predefined number of packets are played at a gradually increasing volume.

There is further provided in accordance with a preferred embodiment of the present invention, a method of sounding wirelessly transmitted digital audio data, including receiving a packet of audio data, detecting an error in the received packet, and playing the packet of audio data if no error has been detected, and playing silence or a previous packet of audio data if the error has been detected.

Preferably, receiving the packet includes receiving two or more copies of the packet, and detecting the error includes determining whether errors occurred in substantially all of the copies.

Preferably, detecting the error includes calculating a value of an error detection code and comparing the calculated value to a transmitted value of the error detection code.

Preferably, the method includes playing silence for a predetermined period after an error has been detected.

There is further provided in accordance with a preferred embodiment of the present invention, a receiver of wireless audio signals which are compressed and encoded, including a down-converter which receives and down-converts a carrier signal carrying the compressed and encoded audio signals, and a single signal processor which decodes and decompresses the down-converted audio signals and controls the operation of the down converter.

Preferably, the signal processor also performs AGC detection and offset determination.

Preferably, the receiver introduces a delay of less than 50 msec between receiving and decompressing the audio signals.

The present invention will be more fully understood from the following detailed description of the preferred embodiments thereof, taken together with the drawings, in which:

DETAILED DESCRIPTION OF PREFERRED EMBODIMENTS

Figure 1:
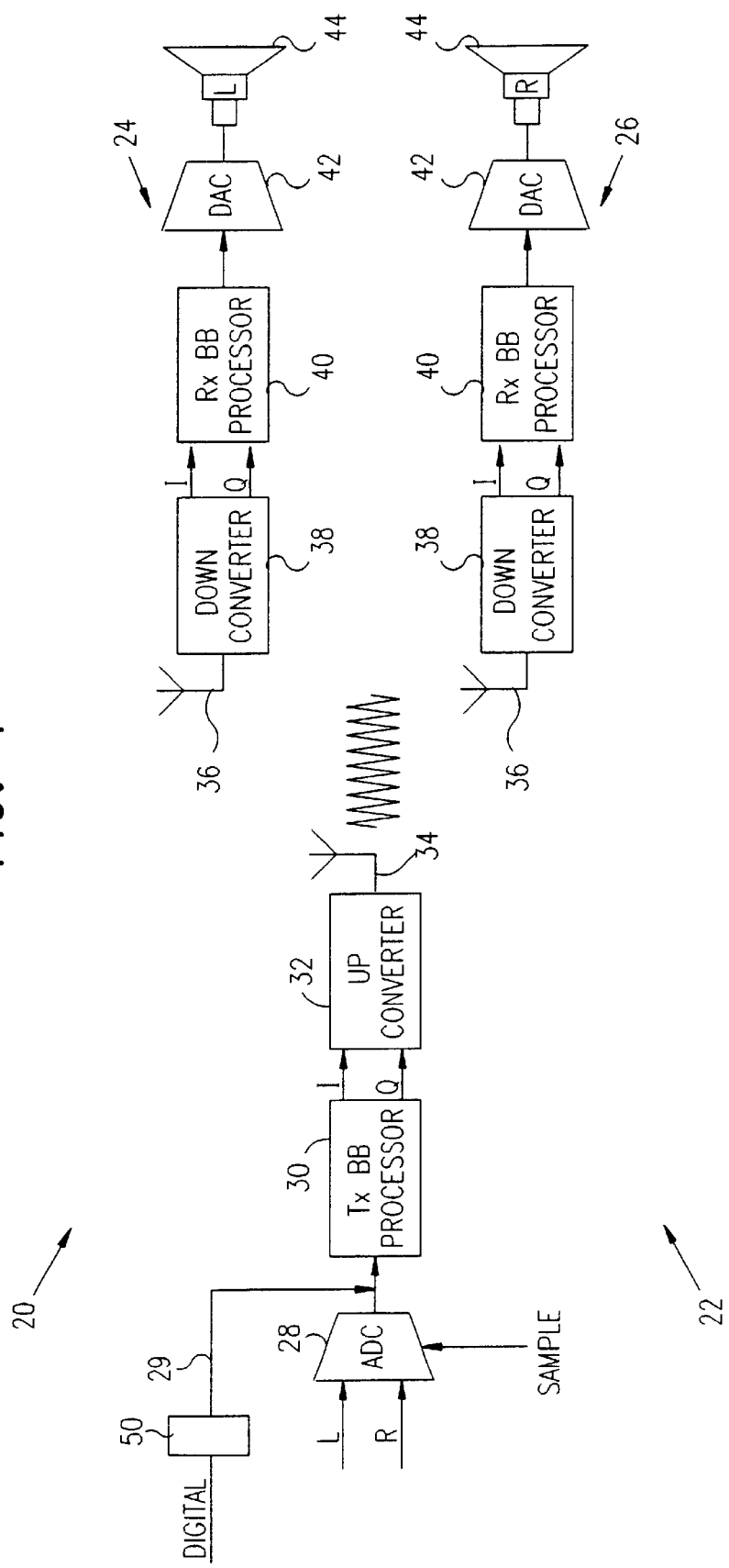
FIG. 1 is a schematic illustration of a wireless speaker system, in accordance with a preferred embodiment of the present invention.

FIG. 1 is a schematic illustration of a wireless speaker system 20, in accordance with a preferred embodiment of the present invention. System 20 comprises a transmitter 22 which receives input audio data, and transmits the data to a plurality of receivers such as a left receiver 24 and a right receiver 26. Although two receivers are illustrated in FIG. 1, it will be obvious to those skilled in the art that the principles of the present invention may be applied to systems having three or more receivers.

Transmitter 22 preferably receives both right and left analog signals of stereo audio data. The right and left signals are preferably converted to digital form by an A/D converter 28. Alternatively or additionally, transmitter 22 may receive digital signals via an interface 29, and these signals are naturally not passed through A/D 28.

The digital signals are passed to a base-band processor 30, which compresses and encodes the digital signals into two separate signal streams, as will be described below. Preferably, the compression is performed in accordance with an audio compression standard, such as an MPEG protocol, most preferably MPEG-1 layer-1. Preferably, the encoding includes convolution encoding of the compressed data, which generally prevents transient interference from causing substantial damage at any single part of the data, and data framing in which the data is divided into packets of a fixed length, preferably such that each packet is transmitted for about 4 ms.

Preferably, base-band processor 30 also assigns a pair of frequency channels (f1 and f2), as described hereinbelow, for transmission of the packets. The signal streams are passed from processor 30 to an up-converter 32 which converts the signals to RF signals to be transmitted on the assigned channel pair. The RF signals from up-converter are transmitted from an antenna 34 to antennas 36 of receivers 24 and 26. Antennas 34 and 36 preferably comprise omni-directional antennas, although any suitable antenna may be used.

Receivers 24 and 26 comprise down-converters 38, which down-convert the received signals to base-band signals in a reverse-compatible method to the up-conversion performed by up-converter 32. Receivers 24 and 26 further comprise receiver base-band processors 40, which demodulate, decode and decompress the received signals in a manner reverse-compatible with the compression and encoding in processor 30. Preferably, the signals are decoded using a Viterbi algorithm, or a similar method, so as to improve the data extraction from the received signals. The decompressed signals are converted to analog form using a D/A converter 42 and then are passed to speakers 44 which play the decompressed audio signals. Preferably, the delay between the input at transmitter 22 and the playing of the audio signals by speakers 44 is less than 50 msec, most preferably between 30 and 40 msec, such that the delay is substantially unnoticed by listeners.

Figure 2:
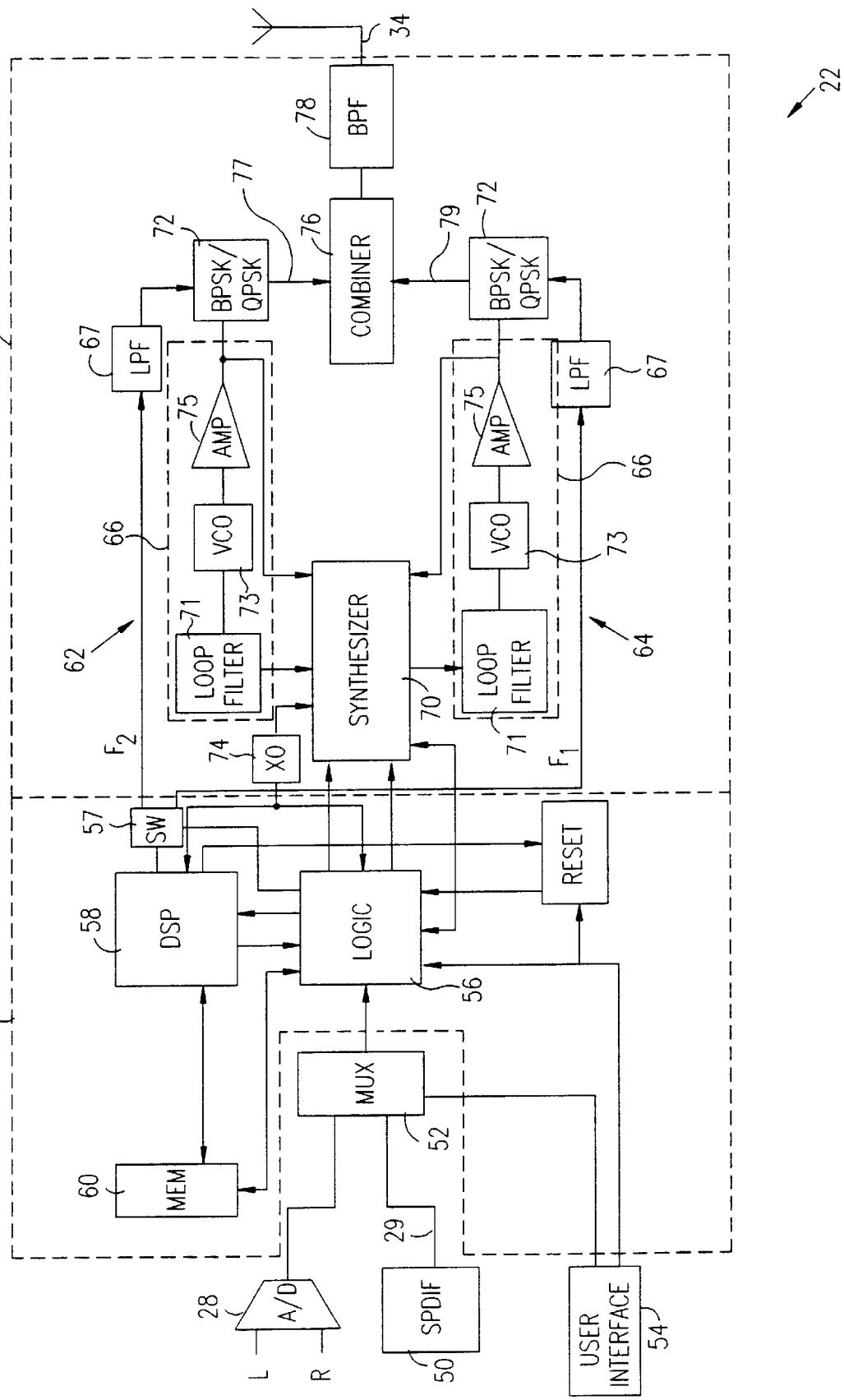
FIG. 2 is a schematic detailed illustration of a transmitter of a wireless speakers system, in accordance with a preferred embodiment of the present invention.

FIG. 2 is a schematic detailed illustration of transmitter 22, in accordance with a preferred embodiment of the present invention. Transmitter 22 preferably comprises separate interfaces for analog audio data which is passed through A/D converter 28 and for digital audio signals which are received through a suitable digital interface, such as a S/PDIF receiver 50. The signals passed to processor 30 are preferably chosen by a multiplexer 52, the setting of which is chosen by a user by means of a switch in a user interface 54. Alternatively or additionally, multiplexer 52 is set by automatic detection of which of converter 28 and receiver 50 is connected to an external audio source. The audio source may comprise, but is not limited to, a tape recorder, a stereo system, a CD player, a DVD player, a computer or a video system.

Processor 30 comprises a logic circuit 56 which controls the operation of the processor and coordinates the operation of its parts as described hereinbelow. Processor 30 further comprises a digital signal processor (DSP) 58, such as a Motorola DSP56002, which compresses, encodes and re-frames the digital audio signals and controls some operations of up-converter 32. Signal processor 58 prepares from the input audio signals two signal streams indicated respectively by arrows 62 and 64 to be sent via up converter 32 to receivers 24 and 26 respectively. Preferably, signal-processor 58, has a processing power of at least 36 MIPS, so as to allow compression and reframing together with other tasks of the signal processor to be performed faster than the input audio sampling rate.

Processor 30 further comprises a memory 60 which is used by signal-processor 58 to store software segments which do not fit in the internal memory of signal-processor 58. Preferably, memory 60 is further used to store a non-volatile copy of the software and parameter values used by the processor. Preferably, memory 60 comprises volatile chips, such as RAM chips, and non-volatile chips such as EEPROM, EPROM and/or PROM chips. Most preferably, memory 60 comprises three chips, a RAM, EPROM, and EEPROM.

The RAM is preferably a static CMOS chip which is used by signal-processor 58 for saving segments of the software and temporary parameters. Alternatively or additionally, more than one chip may be used, for example one chip for data and another chip for software segments. The EPROM is preferably used for holding a non-volatile copy of the software. The EEPROM is preferably a serial interface ($I^2C$) chip in which parameters of the transmission are store. The parameters include, for example, a volume level, a unique ID transmitted along with the audio signals to prevent one system from reading signals from a different system, and the frequency channel number on which the RF signals are transmitted. User interface 54 preferably allows the user to change or set the parameters using buttons, switches or any other suitable input device. Preferably, processor 30 comprises a watchdog timer, which resets the system automatically when a malfunction occurs.

Up-converter 32 of transmitter 22 preferably receives the signal streams indicated by arrows 62 and 64 and prepares them for transmission in the assigned frequency channels. Up-converter 32 comprises a synthesizer 70, which receives a reference signal at a suitable frequency, such as 24.576 MHz, preferably from a crystal oscillator (XO) 74. Synthesizer 70, together with two closed channels 66, each including a VCO 73, a loop filter 71 and an amplifier 75, produces two RF frequency carrier signals locked to oscillator 74. The RF carrier signals have frequencies determined according to control signals from logic circuit 56. The RF synthesized signals are modulated by respective BPSK modulators 72, which code the phase of the RF signal according to the signal streams indicated by arrows 62 and 64, producing RF signal streams indicated by arrows 77 and 79 respectively. Alternatively or additionally, a pair of QPSK modulators may be employed instead of BPSK modulators 72. Thereafter, signal streams indicated by arrows 77 and 79 are combined by a combiner 76, and are passed through a band pass filter (BPF) 78 to ensure that the transmitted signals are within the appropriate FCC-allowed band.

Preferably, the signal streams indicated by arrows 62 and 64 are filtered by two low pass filters 67 for eliminating unnecessary frequency components from the transmitted spectrum, so as to keep the signals within a desired narrow bandwidth. These components if not filtered might interfere with other systems, such as neighboring wireless speaker systems, or may violate the FCC regulations.

Figure 3:
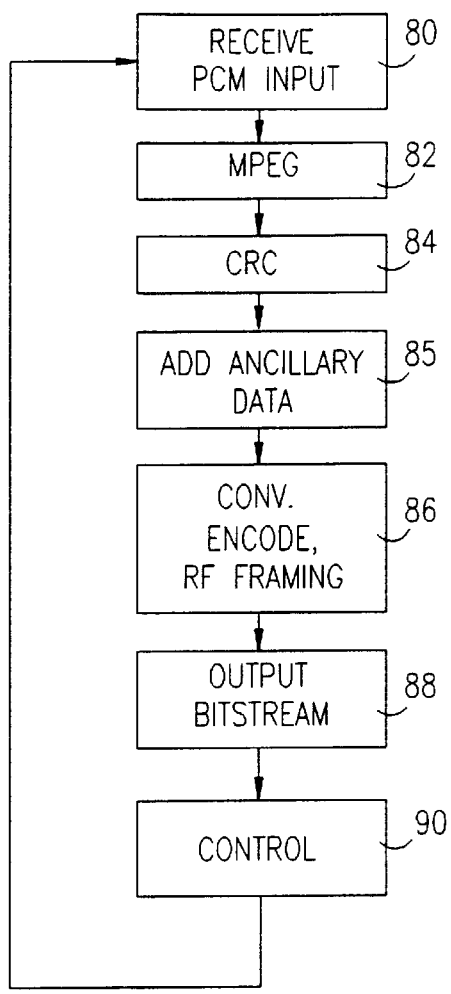
FIG. 3 is a flow chart of the actions of a processor in the transmitter of FIG. 2, in accordance with a preferred embodiment of the present invention.

FIG. 3 is a flow chart showing the actions of processor 30 in encoding and transmitting audio data, in accordance with a preferred embodiment of the present invention. Preferably, the signals received by processor 30 are accumulated in memory 60, as indicated in block 80. Each time a number of bytes suitable for MPEG compression are accumulated, they are preferably compressed by signal-processor 58, as indicated in block 82, to form a compressed segment. Preferably, the MPEG compression generates separate left and right packets, for the left and right stereo signals. Further preferably, the MPEG compression produces packets of identical length for each of the left and right packets, and if necessary, the packets are padded to be of the same size. Preferably, an error detection code, such as a CRC (cyclic redundancy check) code, is added to each packet during and/or after compression, as indicated in block 84. Preferably, as indicated in block 85, other ancillary information, as described below, is added to each field or frame, most preferably using data fields allocated in accordance with the MPEG algorithm.

The compressed signals, CRC code and ancillary information are preferably convolution encoded as is known in the art and RF-framed, as indicated in block 86.

Preferably, the RF frame includes both CW and Barker fields, both of which are known in the art. The CW field is used so as to enable receivers 24 and 26 to use coherent detection and achieve high performance in locking onto the transmitted signals. The Barker field is used by the receivers to identify the transmitted signal and synchronize between the transmitter and the receivers. A preferred format of the RF-frame is described hereinbelow with reference to FIG. 5. Alternatively or additionally, the compressed signals may be bit-interleaved to further reduce deleterious effects of transient interference.

The RF-framed signals are passed to up-converter 32 in the two signal streams 62 and 64, as indicated in block 88 (and shown in FIG. 2). Preferably, the RF-framed signals are output from signal-processor 58 in a single stream including left and right bits in alternation. A switch 57 preferably directs the signals into streams 62 and 64 alternately, under the control of logic circuit 56. During the generation of a first pair of frames, the left bits are passed, for example, to stream 64 while the right bits are passed to stream 62. After about 4 msec, when a second pair of frames is passed out of signal-processor 58, switch 57 directs the bits such that the right bits are passed to stream 64 and the left bits to stream 62. Thereafter, switch 57 directs the right bits back to stream 62, and this procedure is continually repeated.

Preferably, while signal-processor 58 is waiting for enough samples to perform MPEG compression, it performs control tasks, as indicated in block 90, such as volume and frequency control, ID generation, checking the settings of user interface 54 and verification that processor 30 is properly operating.

Figure 4:
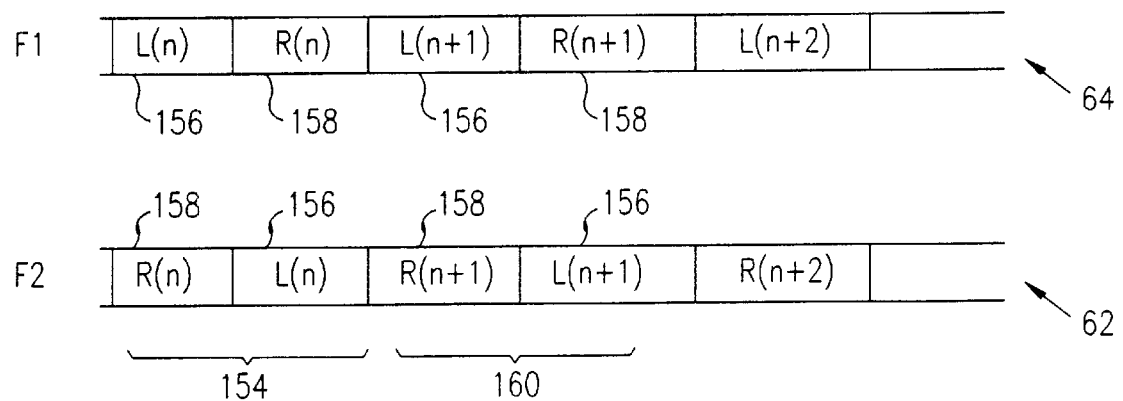
FIG. 4 is a schematic illustration of a pair of signal streams generated in the transmitter of FIG. 2, in accordance with a preferred embodiment of the present invention.

FIG. 4 is a schematic illustration of a pair of signal streams 64 and 62 passed from processor 30 to up-converter 32, in accordance with a preferred embodiment of the present invention. Streams 64 and 62 comprise sequences of frames 154, in which each frame 154 includes compressed audio data sampled at a time (n), along with other information, as shown and described with reference to FIG. 5. Each frame 154 includes two packets 156 and 158 which contain, respectively, left and right audio data inputted to transmitter 22. Preferably, streams 62 and 64 comprise identical audio information, but in different orders. Stream 62, which is transmitted on one frequency channel (f2), is primarily destined for right receiver 26 and contains frames 154 in which packet 158 precedes packet 156. Stream 64, which is transmitted on the other frequency channel (f1), is primarily destined for left receiver 24 and therefore contains frames 154 in which packet 156 precedes packet 158.

Thus, packets 156 and 158 are ordered such that at any given time, streams 64 and 62 do not contain the same data. Therefore, if receiver 24 is assigned, for example, to the left speaker, it may read both copies of a single left packet in sequence, without having to read from two different frequencies at the same time. This redundancy enables each of the receivers to choose and play whichever of the streams gives the better quality at any given time. Preferably, packets 156 and 158 appear in alternation in streams 64 and 62 such that no two right packets 158 or left packets 156 appear consecutively.

Preferably, both copies of packet 156 are read and only then receiver 24 decides which copy of packet 156 is preferred. Alternatively, receiver 24 first reads stream 64 in which left packet 156 appears earlier. Only if packet 156 is defective does the receiver read the packet on stream 62. Receiver 26 on the other hand first reads stream 62 since in this stream right packet 158 appears earlier such that the right receiver reads the right packet first.

Figure 5:
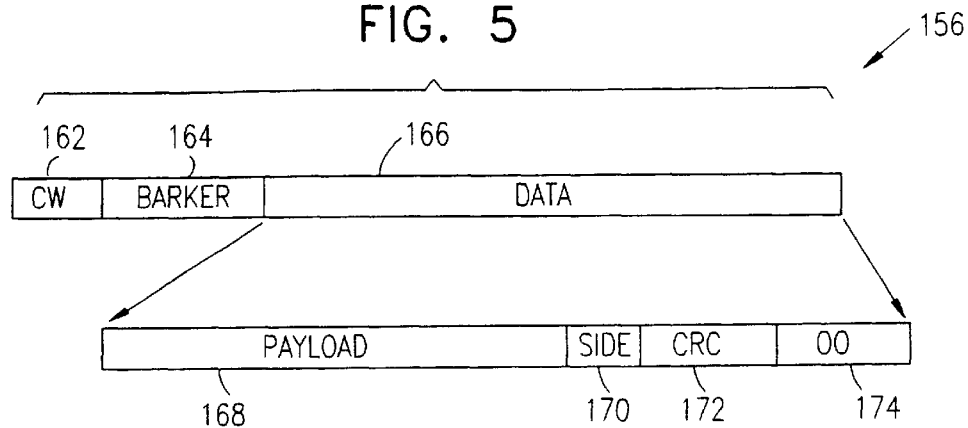
FIG. 5 is a schematic detailed illustration of a data packet in one of the signal streams of FIG. 4, in accordance with a preferred embodiment of the present invention.

FIG. 5 is a schematic detailed illustration of the contents of packet 156 (or equivalently, packet 158), in accordance with a preferred embodiment of the present invention. Packets 156 and 158 comprise a data segment 166 which includes a payload field 168 which contains the compressed audio data, an ancillary field 170 which contains control data sent from the transmitter to the receivers, and an error detection field 172. Error detection field 172 is preferably 16 bits long, and contains an error detection code, such as a CRC code, which is used by receivers 24 and 26 to detect transmission errors. Preferably, data segment 166 terminates with a termination field 174 which contains a termination code such as binary 00.

Packets 156 and 158 preferably have a CW field 162, having a length which requires a transmission time of about 128 microseconds, which aids receivers 24 and 26 in identifying and locking onto the phase and the frequency of the transmitted signals.

Preferably, packets 156 and 158 also include a Barker field of between 16 and 32 bits which aids receivers 24 and 26 in synchronization to transmitter 22. It will be obvious to those skilled in the art that the use of other numbers of bits in the packets is within the scope of the present invention, and the present numbers are given herein for the purpose of illustration.

Figure 6:
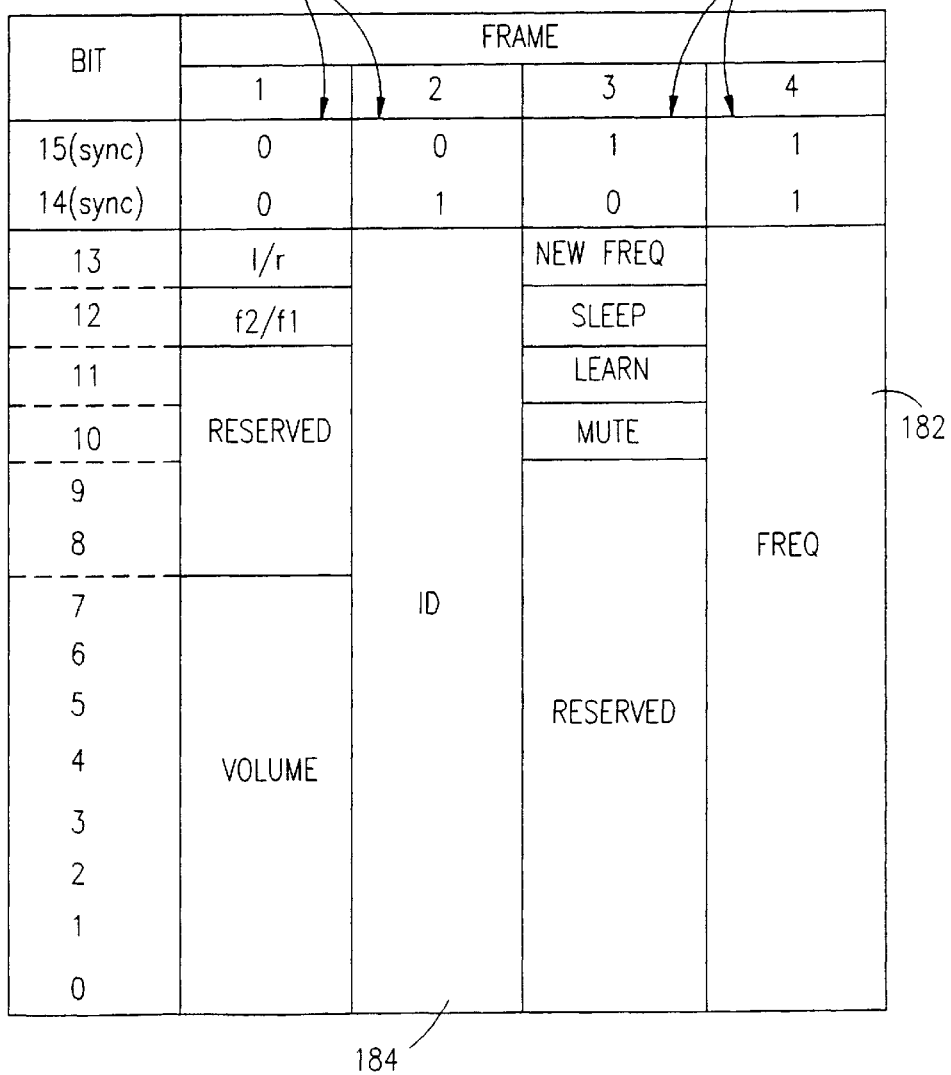
FIG. 6 is a table illustrating the contents of a word of side data in the packet of FIG. 5, in accordance with a preferred embodiment of the present invention.

FIG. 6 is a schematic detailed illustration of the contents of ancillary field 170, in accordance with a preferred embodiment of the present invention. Preferably, ancillary field 170 is relatively small, such as about 16 bits long, so as to reduce its impact on the channel capacity of packets 156 and 158. Preferably, the ancillary fields of four consecutive packets 156 or 158, form an entire control block 180, which includes substantially all the necessary control information. Alternatively, the ancillary fields of four consecutive frames 154 (FIG. 4) form an entire block 180, each ancillary field 170 appearing twice with minor changes (e.g. the right/left indication and volume control) in two consecutive packets 156 and 158, so that to read the entire block 180 it is sufficient to read one copy of each packet. Thus, within four consecutive frames 154, the transmission of which requires a total time of about 32 msec, all the necessary control information is sent to each of receivers 24 and 26.

Preferably, control block 180 comprises four ancillary fields 170, each of which is identified by a synchronization signal which is preferably 2 bits long, leaving 14 bits for control data. Preferably, control block 180 includes 8 bits of volume indication, which indicates the strength of the audio signals in the receiver, instead of attenuating the audio level in the transmitter and losing dynamic range in embedding the volume in the audio signals. Control block 180 further comprises verification fields, such as one bit for indicating which of the pair of frequency channels (f1 or f2) is carrying the control block, and one bit for left/right indication. The frequency verification field is used in conjunction with a frequency identification field 182, which includes a suitable number of bits to uniquely describe the frequencies used by the system, for example, 14 bits. Field 182 indicates the exact frequency on which the present signal stream was sent. If receiver 24 or 26 locks onto a sporadic off-channel transmission of the packet, the receiver can use this data to lock onto the correct frequency.

Preferably, block 180 further includes an ID field 184 of a suitable number of bits, preferably 14 bits, which contains the unique ID of the transmission. The ID is used by receivers 24 and 26 to verity that they are tuned onto signals from transmitter 22 of their own system 20, and not to a different transmitter in their vicinity. Preferably, the ID is transmitted in each ancillary data cycle. Preferably, as described hereinbelow, receivers 24 and 26 include a memory 280 (FIG. 7) in which the ID is stored. Receivers 24 and 26 compare the received ID in ID-field 184 to the ID in memory 280, and only audio signals in packets in which the ID is the same as in memory 280 are played by the receiver.

Preferably, when system 20 is first used, the ID is preferably chosen by transmitter 22 at random, for example, using a random number generator in processor 30 (which is taken from the MPEG encoding and the CRC function). Thus, it is extremely unlikely that two transmitters, even of an identical model, will have the same ID. In order to record the ID in the memories 280 of receivers 24 and 26, a user of the system preferably instructs the receivers to acquire an ID currently being transmitted. A user interface 274 of receivers 24 and 26 (FIG. 7) preferably includes a switch that can be used to instruct the receiver to acquire the ID, for example by toggling twice a left-right switch in the user interface. Thereafter, non-volatile copies of the ID are kept in memory 60 of transmitter 22, and in memory 280 of receivers 24 and 26, and there is no need for later user interventions. However, preferably, the user may, if desired, change the ID through user interface 54 of transmitter 22, for example, by continuously pressing a frequency change control for a few seconds. In such a case, the transmitter will preferably notify receivers 24 and 26, using a predetermined protocol, that the ID has changed, so that the receivers store the new ID in memories 280. Alternatively or additionally, the user instructs both the receivers to acquire the new ID.

Thus, the ID is stored in memory 60 of transmitter 22 either when the memory is first used and has no previously stored ID, or upon a user request to change the ID. The ID is stored in memory 280 of receiver 24 and/or 26 upon a direct command from the user or alternatively according to a user-invoked command from transmitter 22 in accordance with a predetermined protocol.

Alternatively or additionally, during production, each system 20 receives a unique ID which is stored both in transmitter 22 and in receivers 24 and 26.

Further alternatively or additionally, block 180 includes a field for transmitting a "learn-ID" command, which instructs the receivers to copy the present transmitted ID to memory 280. The "learn-ID" command is preferably also used when transmitter 22 is about to switch to a new ID. Such switching may be user-initiated, for example, because two neighboring systems have by some rare chance a common ID. Preferably, the "learn-ID" command is transmitted for a predetermined amount of time, together with the new ID, to allow the receivers to save the new ID in their memory 280. The new ID is transmitted in field 184 or, alternatively, in a different field while the old ID is transmitted in field 184 to identify the packet.

Alternatively or additionally, the ID is chosen as a function of the performance of processor 30. For example, to determine the ID, when transmitter 22 shifts the frequency to a new frequency, the ID is chosen according to the time it takes synthesizer 70 to lock onto the new frequency.

Thereafter, transmitter 22 may repeatedly send the ID to receivers 24 and 26 together with the "learn ID" command for a length of time, such as one second. The receiver accepts the ID when the energy of the received transmission is above a predetermined threshold, such as the average signal strength when the transmitter and receiver are at a predetermined distance from one other.

Preferably, control block 180 further comprises a plurality of fields for transmitter commands, which are passed to the receivers. For example, when the quality of the transmission is low, a user may request that the transmitter change the frequency channels in use. Before the transmitter changes the frequency channels, the transmitter preferably transmits one or more control blocks with a "frequency shift" command together with the identity of the new frequency pair. Another transmitter command is "sleep," which tells the receivers to remain silent by turning an output audio amplifier off, and is used at shutdown time, such as during a power failure or when the system is turned off. The sleep command prevents the transient signals of shutdown to cause noise or overheating of the receiver and/or the speaker. The receiver only turns the speaker on when it receives audio signals to be played, and switches the speakers off, to save energy, when it does not receive signals.

In addition, block 180 preferably has a mute field which toggles a mute option, in which when no significant audio signals are identified in the input of transmitter 22, the receivers are switched off temporarily.

Figure 7:
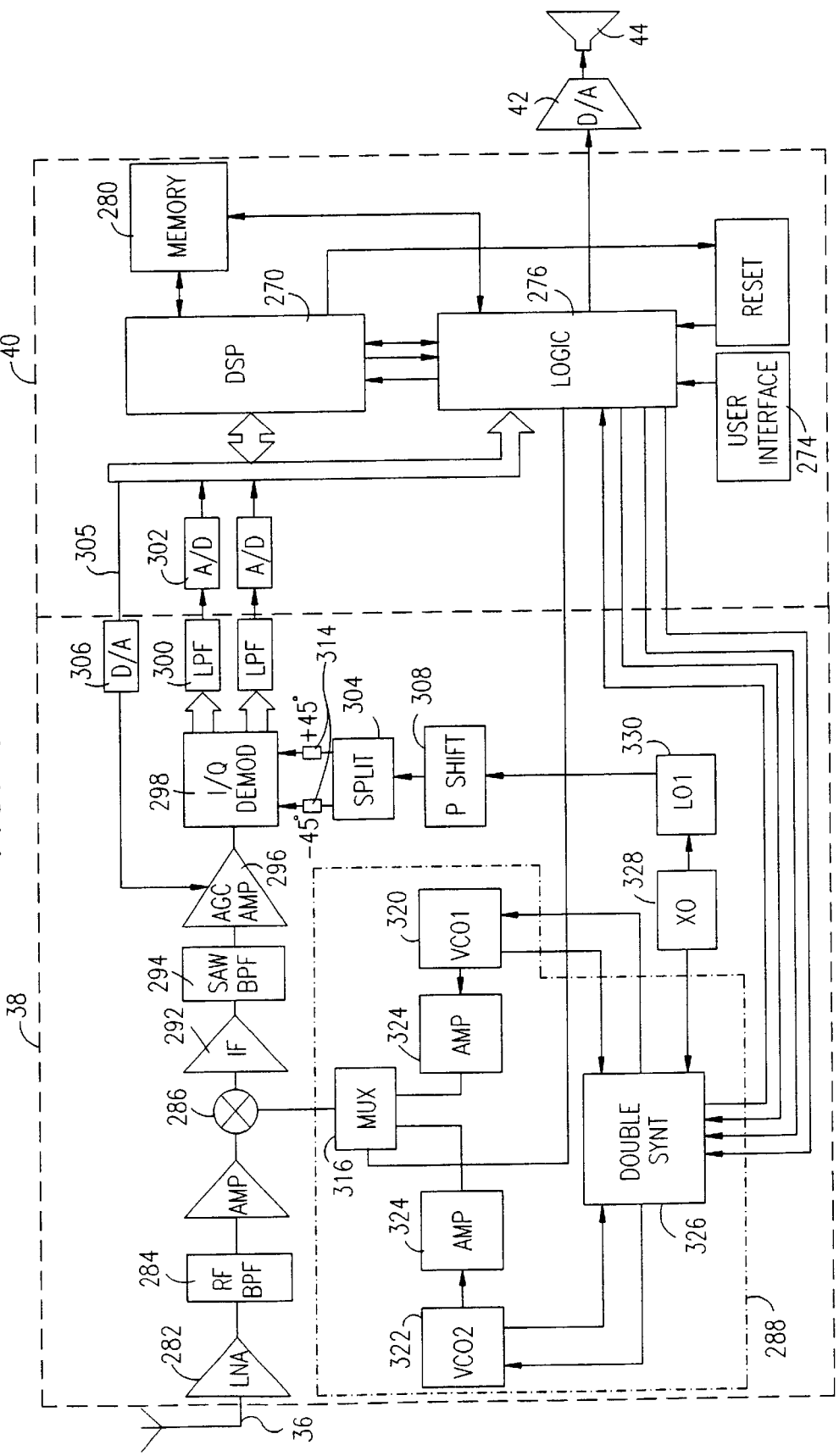
FIG. 7 is a schematic detailed illustration of a receiver in a wireless speaker system, in accordance with a preferred embodiment of the present invention.

FIG. 7 is a schematic detailed block diagram of receivers 24 and 26, in accordance with a preferred embodiment of the present invention. Receivers 24 and 26 comprise circuits compatible with those of transmitter 22, for demodulating and decoding the signals and converting them back to analog form to drive speakers 44.

Down-converters 38 of receivers 24 and 26, preferably include a low-noise amplifier 282 which amplifies the received signals, and a band-pass filter 284 which eliminates undesired noise and other interference. The resulting signals are preferably amplified and down-converted to an intermediate frequency (IF), preferably 110.59 MHz, by a mixer 286, although other frequencies may be used as well.

Mixer 286 uses a synthesized local oscillator signal from an oscillator circuit 288 to down-convert the incoming received signal. Preferably, oscillator circuit 288 comprises at least two local oscillators, preferably, voltage-controlled oscillators (VCOs) 320 and 322, which oscillate at frequencies f1 and f2, respectively. The outputs of VCOs 320 and 322 are preferably amplified by two respective amplifiers 324 and passed to a multiplexer 316 which provides the output from one of amplifiers 324 to mixer 286. Preferably, a selection output of multiplexer 316 is controlled by a logic circuit 276, according to which channel f1 or f2 is to be read at a specific time. A double synthesizer 326 controls VCOs 320 and 322 such that they provide f1 and f2 for a desired channel pair as determined by logic circuit 276. Double synthesizer 326 preferably receives a reference clock signal from a crystal oscillator (XO) 328. In order to switch between receiving at f1 and at f2, logic circuit 276 changes the selection output of multiplexer 316. Thus, receiver 24 switches between f1 and f2 rapidly, preferably within less than 5 μsec, such that no data is lost during the switching.

Preferably, down-converter 38 performs only one down-conversion (in mixer 286), unlike prior art systems which perform at least two down-conversions and use at least two intermediate frequencies. Thus, receivers 24 and 26 can generally be made cheaper and more compact than wireless receivers known in the art.

The output of mixer 286 is preferably fed to an IF amplifier 292, which amplifies the IF signal. The amplified IF frequency signal is passed through a SAW band-pass filter 294 and an AGC amplifier 296 into an I/Q demodulator 298. AGC amplifier 296 is used to implement an AGC soft decision process, which is preferably controlled by processor 40. The AGC process allows working the I/Q demodulator at a predetermined signal level, and thus achieves improved detection performance.

In order to cancel DC offsets which may form in the receiver, processor 40 calculates a DC offset cancellation factor. At acquisition time, as described hereinbelow and indicated in block 210 of FIG. 8, the receiver calculates the average signal amplitude of the incoming packets for a few milliseconds. This average is used as a basic DC offset. Thereafter, during a steady state in which the received signals are played, a minor DC offset correction is preferably calculated based on a small part of each packet, preferably on the Barker field. Thus, a good DC offset estimate is calculated during a minimal period of time during the steady state.

Preferably, demodulator 298 is fed by a signal from a local oscillator (LO1) 330 via a phase shifter 308, the purpose of which is described hereinbelow, and a splitter 304. The LO1 signal is preferably split by splitter 304 and shifted by two phase shifters 314 to provide demodulator 298 with two oscillating signals with a phase shift of 90° relative to each other. Alternatively, a single phase shifter may be used to achieve the 90° phase difference. Thus, demodulator 298 receives separate local oscillator signals for the I and Q paths of the demodulator. Preferably, local oscillator 330 oscillates at a nominal frequency substantially identical to the IF, which is preferably about 110.59 MHz.

The outputs of I/Q demodulator 298 are preferably passed through a pair of low-pass filters 300 to base-band processor 40. Preferably, the filtered signals from demodulator 298 are converted to digital form by a pair of A/D converters 302 when they enter processor 40. Alternatively, the filtered signals are converted to digital form before they are passed to processor 40. Preferably, a feedback line 305 returns a control signal back to AGC amplifier 296. Preferably, feedback line 305 is connected through a D/A converter 306 to regulate an AGC level of the amplifier.

Having local oscillator 330 oscillate at the IF frequency eliminates the need for digital circuitry generally used with local oscillators which oscillate at frequencies which are integer multiples of the IF frequency. However, having oscillator 330 oscillate at the IF frequency is prone to cause leakage between amplifier 296 and oscillator 330, and therefore a DC offset voltage may be formed at the outputs of demodulator 298. Since the I and Q outputs are not at the same phase, their DC offsets may not be the same. Preferably, A/D converters 302 are set to work on a range centered at an average of the DC offsets of the I and Q outputs.

Preferably, phase shifter 308 shifts the signal from local oscillator (LO1) 330 before it enters splitter 304, in order to change the DC offset voltages of outputs I and Q. Preferably, the phase is varied so that the DC offset voltages of both the I and Q outputs are set to suitable values near the middle of the operation range of A/D converters 302. In this manner, a close to optimal dynamic range can be maintained in both I and Q channels.

Preferably, the elements of down-converter 38 are implemented using integrated circuits or other micro-components, so as to reduce the cost and size of the receivers. Specifically, mixer 286, IF-amplifier 292, AGC amplifier 296 and demodulator 298 are preferably integrated in a single integrated circuit, most preferably in an RF 2903 component manufactured by RF Micro Devices of 7341-D West Friendly Ave., Greensboro, N.C. 27410, USA.

Similarly to processor 30 of transmitter 22, processor 40 of receivers 24 and 26 comprises a signal-processor 270, a logic circuit 276, a user interface 274 and a memory 280. Preferably, signal processor 270 comprises a Motorola DSP56009, rather than the more expensive DSP56002 which is preferable for transmitter 22. Preferably, signal processor 270 performs a Viterbi-type decoding of the received packets in order to decode the convolution encoding performed in transmitter 22. In addition, signal processor 270 preferably performs MPEG decompression, AGC detection, DC offset determination and carrier locking. It is noted that in the prior art, at least some of these tasks are performed by separate dedicated hardware.

User interface 274 preferably comprises a LED display which shows the quality of the transmission link on a multi-level scale, a LED display which is used to indicate acquisition, and an identity switch which allows the user to define the identity of speaker 44, e.g., Left/Right. Preferably, the multi-level scale includes at least three quality levels, more preferably, at least five quality levels.

Preferably, system 20 operates with DC coupling, in order to achieve a fast time response. The fast time response allows fast adjustments of the receivers to the different properties of the signals on the two frequency channels, between which the receivers rapidly switch.

Preferably, the pair of frequency channels (f1 and f2) are within an FCC-allowed band, preferably, the ISM band between 902–928 MHz, although substantially any other FCC band may be utilized including the band between 2.4–2.483 GHz and the 5.5 GHz ISM band. Further preferably, the channels are chosen from a plurality of predetermined channels in the ISM band. Preferably, the pair of frequency channels are chosen from a plurality of predefined pairs of frequency channels, preferably 11 pairs, in which each channel is separated by about 0.9–1.1 MHz from neighboring channels. Preferably, the channels are within the 902–928 MHz range and more preferably within the 904–914 and 916–926 MHz ranges. Preferably, f1 and f2 are separated by a constant frequency difference which is sufficient so that apparatus which may interfere with one of the streams in use would not interfere with both streams at once. Preferably, the constant difference is at least 10 MHz, and more preferably at least 12.288 MHz. Preferably, substantially all the frequency channels have a signal bandwidth of less than 1 MHz, and more preferably less than 750 kHz.

When transmitter 22 is operated, the transmitter checks in memory 60 for the pair of channels most recently used, and these channels are used again for transmission. If no indication of the channels is found in memory 60, for example when system 20 is first operated, the transmitter randomly chooses a pair of channels from the predefined frequency channels for transmitting audio signals. Preferably, user interface 54 (FIG. 2) includes a frequency shift button or other switch, so that when a user is not satisfied with the transmission quality, he may press the button, causing the transmitter to randomly choose a new pair of channels from the predefined frequency channels for the transmission.

Alternatively or additionally, the receiver may transmit back to the transmitter a command to change the pair of channels since the quality of transmission is beneath a predetermined level. When the frequency channels are changed, transmitter 22 preferably notifies receivers 24 and 26 to what frequency to move, so that they may easily tune to the new frequency pair.

Preferably, before choosing the pair of frequencies, transmitter 22 runs self-test procedures and initializes its hardware. Preferably, the self-tests include passing through all the carrier frequencies and testing that synthesizer 70 locks onto all the frequencies.

Figure 8:
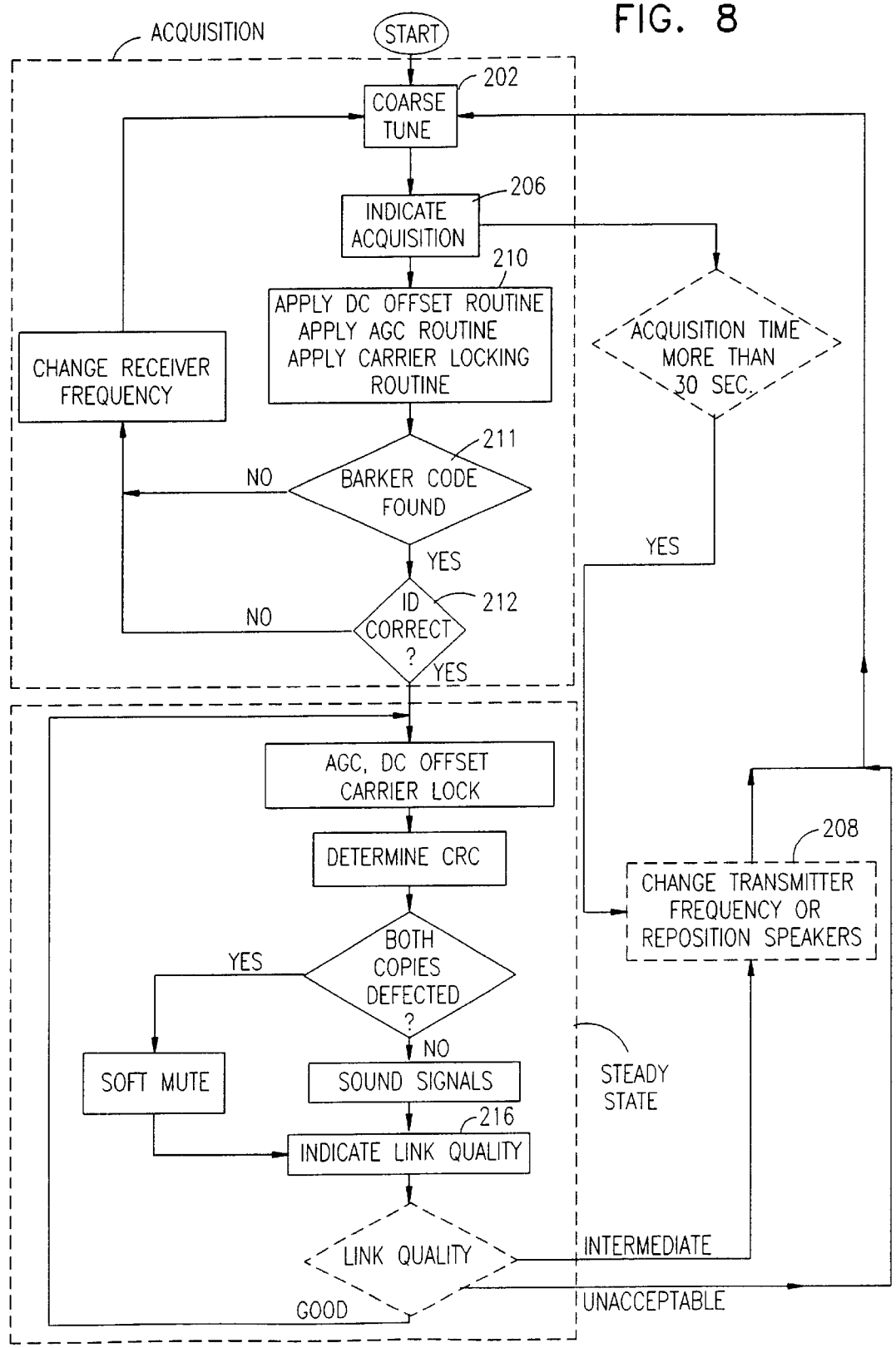
FIG. 8 is a flow chart of the actions performed by the receiver and optionally by a user of the receiver in tuning in to the transmitter signals, in accordance with a preferred embodiment of the present invention.

FIG. 8 is a flow chart showing the actions performed by receivers 24 (and 26) and a user thereof, in tuning onto the signals transmitted by transmitter 22, in accordance with a preferred embodiment of the present invention. The blocks indicated by dashed lines refer to optional actions taken by the user and/or performed in systems in which the receiver has back-transmission capabilities as described hereinbelow in conjunction with FIG. 9. The procedure illustrated in FIG. 8 is particularly useful in assisting the user in positioning the speakers and in selecting appropriate transmission frequencies. As indicated in block 202, receiver 24 coarsely tunes onto a transmitting carrier frequency within the band of system 20. Preferably, the coarse tuning is performed by stepping local oscillator 288 across the plurality of predefined frequencies, and choosing a frequency on which transmitted signals from transmitter 22 are detected by the receiver.

Preferably, when receiver 24 is powered-on it defines a current channel pair, including two channels (f1 and f2), in a manner similar to the channel definition performed by transmitter 22. Preferably, receiver 24 checks its memory for the previously used pair of channels. If there is no indication of such channels in the memory, the current channel pair is assigned a random channel pair from the predefined channel set or an arbitrary predetermined channel pair. Receiver 24 tunes onto the first channel (f1) of the current pair. If the receiver succeeds in locking onto the frequency, it continues with signal acquisition as described hereinbelow. However, if receiver 24 fails to lock onto the channel over more than a suitable predetermined interval, such as 0.1 sec, the receiver tries to tune to the second frequency (f2) of the pair. Alternatively, receiver 24 immediately moves to a different pair of frequency channels. As with the previous channel, receiver 24 tries to lock onto the frequency. If the attempt fails, receiver 24 moves to the next pair, and so on, until the receiver succeeds in locking onto one of the channels.

If, however, locking failed on all the predefined frequency channels, receiver 24 tunes back to the first channel with a small shift, such as 50 kHz, in a first direction. The above process is repeated with the small shift until receiver 24 succeeds in locking onto one of the channels. If again receiver 24 does not succeed in locking, the process is repeated with a shift in the opposite direction.

Preferably, after receiver 24 locks onto a channel, fine tuning is performed. Preferably, synthesizer 326 shifts local oscillator 288 in small steps, such as steps of between about 25 and 50 kHz, in the vicinity of the locked channel to determine the best frequency to be used by the receiver to read the signals on the channel. Preferably, a phase-locked loop (PLL) in signal processor 270 locks onto the CW field of the received packet and thus determines a most desired frequency to which to tune. Preferably, if the desired frequency is distanced from f1 or f2 by more than 30 kHz, processor 270 shifts local oscillator 288 by 50 kHz in order to compensate for the frequency difference. Otherwise, the difference is considered relatively small and is preferably ignored.

Alternatively or additionally, after receiver 24 locks onto a channel, synthesizer 326 shifts local oscillator 288 an intermediate step of, for example, about 50 kHz, and if locking is still successful, the exact required frequency shift for fine tuning is calculated according to the signals at the original and shifted frequencies.

Preferably, after receiver 24 locks onto a channel f1 local oscillator 288 is switched to f2 (of the channel-pair of f1,f2) to verify reception of signals on that channel, too. Alternatively or additionally, fine tuning and/or reception verification are performed only after the ID is verified as described hereinbelow.

Preferably, receiver 24 indicates acquisition success, for example, by lighting a LED in the receiver, as indicated in block 206.

If a user becomes aware that acquisition did not succeed for more than a predetermined tolerance period, for example, 30 sec, the user may initiate switching of the transmission channel of transmitter 22 or repositioning of receiver 24, as indicated in block 208. Alternatively or additionally, receiver 24 sends a control signal back to transmitter 22 requesting that it switch its transmission channel.

During acquisition, a DC offset cancellation routine, as described above, is preferably run, to cancel the DC offset in the receiver, as indicated in block 210 in FIG. 8. Preferably, an AGC routine determines the gain level suitable for the present channel. Preferably, this routine is also repeated during steady state operation of system 20, albeit in a reduced and faster form, as described hereinbelow. In addition, a carrier locking routine is preferably applied to lock the frequency pair of the receiver. The carrier locking routine is preferably performed continually both during acquisition and in steady state, so as to ensure continuous reception of the transmitted signals despite frequency shifts due to aging and temperature changes, for example. Thereafter, receiver 24 determines whether the Barker code of the transmitted field is found, as indicated in block 211. If the Barker code is not found the receiver has most probably tuned onto an unrelated signal, and the proper signal from transmitter 22 is assumed to be on a different channel. Therefore, the receiver returns to coarse tuning in block 202 to tune onto a different channel.

If the signal includes the Barker code, a few packets 156 from the received signals are read, until the frequency identifier and/or the ID identifier in control block 180 are determined. The receiver checks whether the frequency and ID in control block 180 are as expected according to the contents of memory 280, as indicated in block 212. If the frequency is not as expected, the receiver returns to block 202 and tunes onto the next frequency channel or onto the frequency indicated in block 180. If the ID is not as expected, the receiver has evidently received signals from a different system. Receiver 24 then returns to coarse tuning, indicated in block 202, to find a different frequency, which is transmitted from transmitter 22 of system 20 to which the receiver belongs. If the ID and frequency are correct, it is confirmed that the receiver is on the correct frequency, and the receiver moves to the steady state, in which the transmitted audio signals are played.

During steady state, while the audio signals are played, the quality of the transmission is periodically or continually evaluated, and a link quality indication is output to the user, as indicated in block 216. The indication may be output using an LED bar chart, preferably with at least three different output levels, such as unacceptable, acceptable and good.

In a preferred embodiment of the present invention, each of the at least three levels is represented by a separate LED of a different color, e.g., red, yellow and green. Preferably, the unacceptable level signifies that packets with errors are being detected, the acceptable level signifies that the signal strength has limited safety margins, and the good level signifies that no errors were detected and that the signal strength is good.

Alternatively or additionally, the quality indication has at least five levels, which are indicated numerically, for example using a 7 segment LED. Preferably, the quality indication takes into account the error rate and signal strength of the transmission. Alternatively, the error rate and signal strength are indicated on separate multi-level scales.

According to the link quality indication, the user preferably shifts the speaker and/or invokes a change in the frequency to achieve the highest possible quality indication. Preferably, when the link quality is unacceptable, receiver 24 or 26 automatically returns to acquisition, starting at block 202.

Preferably, the link quality indication is based both on a signal/noise level and on a signal error rate. Preferably, receiver 24 evaluates the AGC level at input amplifier 296, which is indicative of the strength of the signal received. In steady state, the AGC level is preferably calculated with respect to a small part of the received signals, preferably the CW field, so as to minimize the time required to determine the AGC level. Preferably, the AGC level calculated during acquisition is used as a base level for the steady-state AGC calculations. In addition, the CRC error rate is evaluated. A high error rate indicates that although the signal strength is sufficient, there is interference at the selected frequency or in the current position or orientation of the receiver. The AGC level and CRC error rate are combined to determine the indication of link quality that is output to the user. As noted above, the user preferably repositions the receiver and/or shifts the frequency to improve the link quality until a good link quality is displayed. Unlike system 20, wireless speaker systems known in the art evaluate link quality based only on the signal strength, not the error rate, and do not provide a multilevel link quality output.

Preferably, when transmitter 22 switches to a different channel, it first notifies the receivers on the current channel to which channel it is switching. Such switching may be user initiated, or in two-way communication systems (as described further hereinbelow), it may be requested by a receiver which identifies a low-quality link. Preferably, the transmitter transmits to the receivers an indication that the channel is being changed, along with identification of a new channel to be used. Preferably, the receiver checks in memory 280 for a required shift, if any, for fine tuning and accordingly tunes onto the new channel, as described above.

Figure 9:
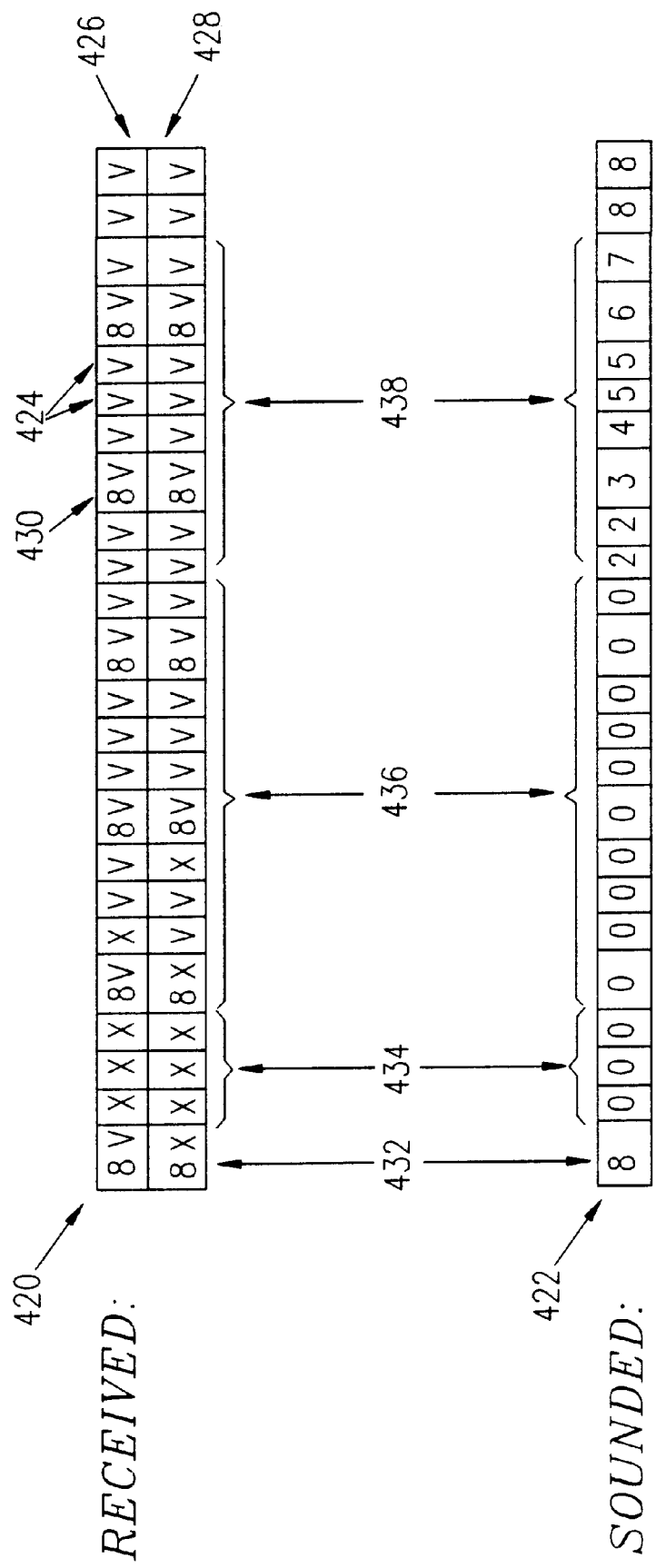
FIG. 9 is a schematic diagram illustrating playing of received packets, in accordance with a preferred embodiment of the present invention.

FIG. 9 is a schematic illustration of a double line 420 of packets received by receiver 24 (or 26) versus a line 422 of packets played audibly (sounded) by the receiver, in accordance with a preferred embodiment of the present invention. Each packet 424 in line 420 is received in two copies 426 and 428, as described hereinabove. A copy which is received with errors is marked in FIG. 9 by an "x", while correctly received copies are signified by a "v". Preferably, one of every four packets include an indication 430 of the volume, in this case "8," at which the audio signals are to be played. When at least one of the copies is received correctly, the signals are played with the indicated volume, as illustrated by a packet 432. Packet 432 is sounded at a volume level of 8, as indicated in line 422, which is the same volume level as the received volume indicated in both received copies 426 and 428 of packet 432.

However, when CRC errors are detected in both copies of a packet, such as in packets 434, the receiver preferably keeps the speaker silent, for example by sounding signals with a zero volume, rather than sounding the defective packet. Therefore, packets 434 on line 422 are marked with a zero volume.

In some cases, interference which causes CRC errors in both copies of a packet comes in bursts which affect a plurality of consecutive packets. Therefore, when one or more of the packets are defective in both copies, the receiver enters an interference state until the interference is over. Alternatively or additionally, the receiver enters the interference state when a minimal predetermined number of consecutive defective packets are encountered. Preferably, in order to prevent frequent changes between silence and sounded audio signals, the receiver keeps the speaker silent during the interference state until a predetermined number of correct packets 436 are received. Preferably, the number of required correct packets is between 8 and 40, most preferably between 25 and 32. Preferably, each of packets 436 includes at least one copy 426 or 428 which is correct. Alternatively, both copies of packets 436 must be correct in order to resume sounding the signals by the speaker. Further alternatively or additionally, sounding of the signals will resume only if the number of packets in which a defective copy is encountered by the receiver is limited to a predefined percentage of packets 436.

Figure 10:
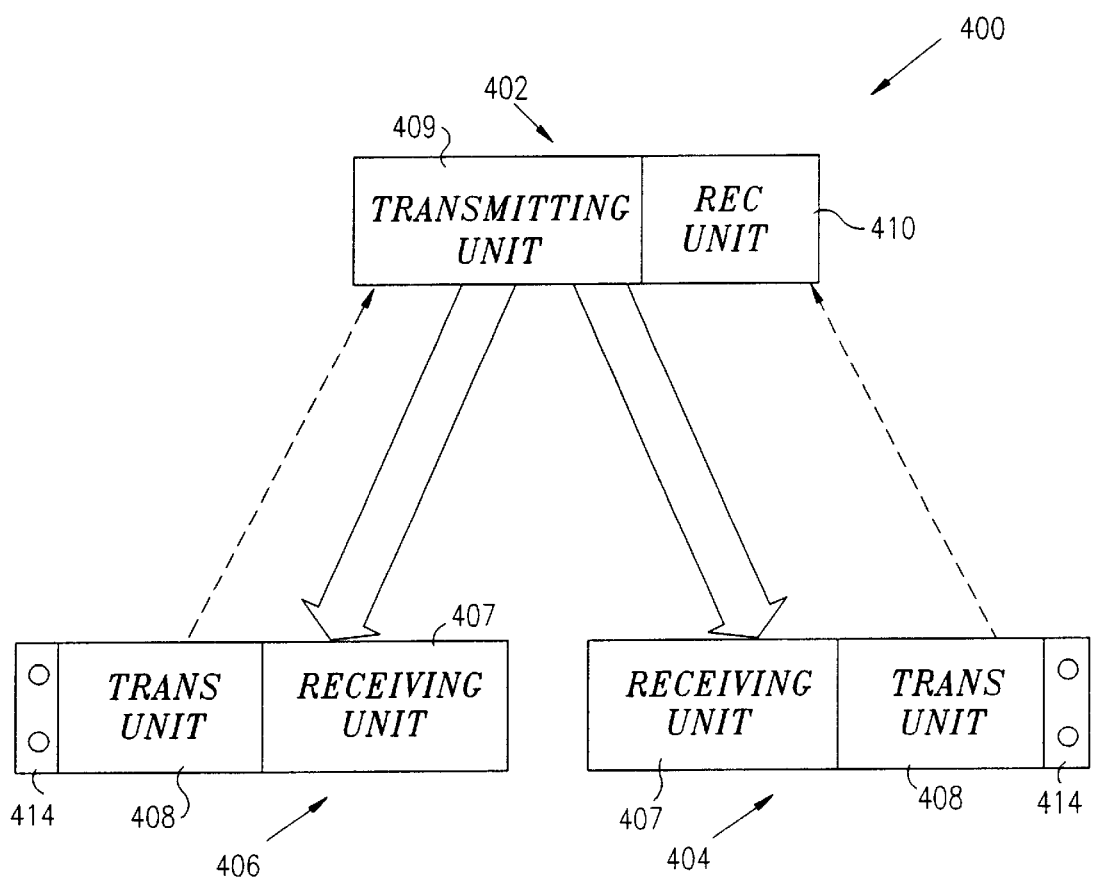
FIG. 10 is a schematic illustration of a two-way wireless speaker system, in accordance with a preferred embodiment of the present invention.

Preferably, a plurality of packets 438, most preferably between about 20 and 50 packets, received after packets 436 are sounded at a low volume, which is gradually increased by small steps to prevent sudden changes in the volume. After packets 438 are sounded, the receiver moves back to steady-state operation.:

FIG. 10 is a schematic illustration of a two-way wireless speaker system 400, in accordance with a preferred embodiment of the present invention. System 400 comprises a transmitter 402 and at least two receivers 404 and 406. Preferably, receivers 404 and 406 have receiving units 407 which operate similarly to receivers 24 and 26 described above, and transmitter 402 comprises a transmitting unit 409 similar to transmitter 22. In addition, receivers 404 and 406 comprise transmitting units 408 which transmit short control messages back to transmitter 402, and transmitter 402 comprises a compatible receiving unit 410. The control messages are preferably transmitted on a separate frequency band from the digital audio transmissions from transmitting unit 409 to receiving units 407, such as one of the predefined frequency channels not used for audio signals. Preferably, the same frequency is used by both receivers 404 and 406 according to a time division scheme. Alternatively or additionally, two separate frequencies are used by the two receivers.

Preferably, receivers 404 and 406 transmit acknowledgment messages every time they receive either a packet, a frame or an entire control block 180. Alternatively or additionally, receivers 404 and 406 transmit messages only when there is some change to report. Preferably, receivers 404 and 406 comprise a user interface 414 which allows the user to change parameters in transmitter 402, such as the transmission carrier frequencies. Thus, when receiver 404 is relatively far from transmitter 402, a user may use user interface 414 and need not go all the way to the transmitter to change parameters. Alternatively or additionally, receivers 404 and 406 transmit indication of the link quality to transmitter 402, so as to automatically shift the frequency channels to improve the link quality.

It will be appreciated that the preferred embodiments described above are cited by way of example, and the full scope of the invention is limited only by the claims.

What is claimed is:

1. A wireless transmission system for transmitting stereophonic audio data, comprising:
    a transmitter which re-frames and compresses the stereophonic audio data into a plurality of packets, in which each stereophonic frame is re-framed as a pair of compressed monaural data frames, and wirelessly transmits at least two copies of each packet during substantially non-overlapping periods; and
    one or more receivers which receive the plurality of packets and assess a quality level of at least one of the copies thereof, so as to extract the audio data from one of the copies having a desired quality level.

2. A system according to claim 1, wherein the transmitter compresses the data using a standard compression method.

3. A system according to claim 1, wherein the transmitter re-frames the data by adding a correction code to audio data.

4. A system according to claim 1, wherein each packet comprises audio signals belonging to only one of the pair of mono signals.

5. A system according to claim 1, wherein the transmitter adds a volume level indication to at least some of the packets, so that the audio data has a generally constant magnitude irrespective of the volume level.

6. A system according to claim 1, wherein the transmitter transmits the at least two copies on at least two respective, distinct carrier frequencies.

7. A system according to claim 6, wherein the distinct frequencies are mutually separated by least 10 MHz.

8. A system according to claim 6, wherein re-framing the data comprises adding an indication of the frequency at which the packets are transmitted.

9. A system according to claims 6, wherein a user initiates a change of the frequencies by inputting a user signal to the transmitter.

10. A system according to claim 6, wherein the receivers automatically tune in to the distinct frequencies.

11. A system according to claim 6, wherein the transmitter transmits an indication of the distinct frequencies along with the signals.

12. A system according to claim 6, wherein the frequencies are in the 902–928 MHz band.

13. A system according to claim 1, wherein the plurality of packets are transmitted in a signal having a bandwidth narrower than 1 MHz.

14. A system according to claim 1, wherein the receiver assesses the quality of a second copy of the at least one copies if a first copy of the at least one copies has an undesired quality.

15. A system according to claim 1, wherein each receiver assesses the quality of the at least two copies of the packets and extracts the audio data from the copy which is of better quality.

16. A system according to claim 1, wherein when the quality level of substantially all of the copies of a packet is beneath a predetermined quality threshold, the audio data in the packet is discarded by the receiver.

17. A system according to claim 16, wherein the receiver plays silence instead of the discarded audio data.

18. A system according to claim 16, wherein a copy is beneath the predetermined quality threshold when an error is detected in the copy.

19. A system according to claim 1, wherein the transmitter adds an ID to the packets, and the receivers ignore packets which do not carry the correct ID.

20. A system according to claim 1, wherein the receivers comprise back-transmitters which transmit control commands back to the transmitter.

21. A wireless speaker system for audio data, comprising:
    a transmitter which re-frames the audio data in a packet including tuning information and wirelessly transmits the audio data on at least one carrier frequency in accordance with the tuning information; and
    at least one speaker, which automatically tunes in to the carrier frequency using the tuning information and plays the audio data.

22. A system according to claim 21, wherein the tuning information comprises an identification of the carrier frequency.

23. A system according to claim 21, wherein the tuning information comprises an identification code of the at least one speaker.

24. A system according to any of claims 21, wherein the tuning information comprises an error detection code.

25. A method of wirelessly transmitting digital stereophonic audio data, comprising:
    re-framing and compressing the stereophonic audio data such that each stereophonic frame is re-framed as a pair of compressed monaural data frames;
    transmitting at least two copies of the re-framed audio data during substantially non-overlapping periods;
    receiving the at least two copies;
    assessing a quality level of one or more of the at least two copies; and
    extracting the audio data from one of the copies.

26. A method according to claim 25, wherein transmitting the at least two copies comprises transmitting the at least two copies on at least two respective, distinct carrier frequencies.

27. A method according to claim 26, wherein transmitting on the at least two respective, distinct carrier frequencies comprises transmitting on at least two distinct frequencies which are mutually separated by at least 10 MHz.

28. A method according to claim 26, wherein re-framing the data comprises adding an indication of the frequency at which the copies are transmitted.

29. A method according to claim 26, wherein receiving the at least two copies comprises automatically tuning the receivers in to the distinct frequencies.

30. A method according to claim 25, wherein assessing the quality comprises determining an error rate and an AGC level of the received copies.

31. A method according to claim 25, wherein assessing the quality comprises determining whether errors have occurred in the at least two copies, and extracting the data comprises discarding the at least two copies when errors have occurred in substantially all of the at least two copies.

32. A method according to claim 25, wherein re-framing the audio data comprises a volume indication to the re-framed audio data.

33. A method according to claim 25, wherein re-framing, transmitting, receiving, assessing and extracting the audio data introduce a delay of less than 50 msec.

34. A wireless transmission system for transmitting data, comprising:

a transmitter which re-frames the audio data into a plurality of packets and wirelessly transmits the packets; and one or more receivers which receive the plurality of packets, determine whether the transmitted packets are defective, and convey non-defective packets to be played by a speaker, wherein after receiving a first predefined number of defective packets, the one or more receivers discard a second predefined number of non-defective packets before resuming conveying non-defective packets to the speaker.

35. A system according to claim 34, wherein the transmitter transmits at least two copies of each of the packets, and wherein defective packets comprise packets of which substantially all copies are defective.

36. A system according to claim 34, wherein the first predefined number is between 1 and 3.

37. A system according to claim 34, wherein the second predefined number is between 25 and 32.

38. A system according to claim 34, wherein a third predefined number of packets received after the second predefined number of packets are played at a gradually increasing volume.

* * * * *